United States Patent
Bessinger et al.

(10) Patent No.: US 9,411,547 B1
(45) Date of Patent: Aug. 9, 2016

(54) COMPENSATION FOR PRINT SHIFT IN STANDARDIZED FORMS TO FACILITATE EXTRACTION OF DATA THEREFROM

(71) Applicant: DST Technologies, Inc., Kansas City, MO (US)

(72) Inventors: Keith Bessinger, Kansas City, MO (US); John Kirchmeier, Kansas City, MO (US)

(73) Assignee: DST Technologies, Inc., Kansas City, MO (US)

( * ) Notice: Subject to any disclaimer, the term of this patent is extended or adjusted under 35 U.S.C. 154(b) by 0 days.

(21) Appl. No.: 14/811,069

(22) Filed: Jul. 28, 2015

(51) Int. Cl.
  G06F 3/12 (2006.01)
  H04N 1/00 (2006.01)

(52) U.S. Cl.
  CPC .............. *G06F 3/1243* (2013.01); *G06F 3/125* (2013.01); *G06F 3/1208* (2013.01); *G06F 3/1252* (2013.01); *H04N 1/00721* (2013.01)

(58) Field of Classification Search
  USPC ........................................................ 358/1.12
  See application file for complete search history.

(56) References Cited

U.S. PATENT DOCUMENTS

| | | | | |
|---|---|---|---|---|
| 5,054,098 A | * | 10/1991 | Lee | G06K 9/3283 382/289 |
| 5,159,667 A | | 10/1992 | Borrey et al. | |
| 5,321,770 A | * | 6/1994 | Huttenlocher | G06K 9/00463 382/174 |
| 5,434,933 A | * | 7/1995 | Karnin | G06K 9/2054 382/192 |
| 5,438,630 A | | 8/1995 | Chen et al. | |
| 5,825,919 A | | 10/1998 | Bloomberg et al. | |
| 5,850,476 A | | 12/1998 | Chen et al. | |
| 5,867,597 A | | 2/1999 | Peairs et al. | |
| 6,442,555 B1 | | 8/2002 | Shmueli et al. | |
| 7,475,061 B2 | * | 1/2009 | Bargeron | G06F 17/30011 |
| 7,561,734 B1 | * | 7/2009 | Wnek | G06F 17/243 382/159 |
| 7,711,192 B1 | | 5/2010 | Smirnov | |
| 7,793,824 B2 | | 9/2010 | Lapstun et al. | |
| 8,478,761 B2 | | 7/2013 | Moraleda | |
| 8,831,350 B2 | | 9/2014 | Highley | |
| 2009/0018990 A1 | | 1/2009 | Moraleda | |
| 2013/0177246 A1 | | 7/2013 | Stokes | |

* cited by examiner

*Primary Examiner* — Ngon Nguyen
(74) *Attorney, Agent, or Firm* — Lempia Summerfield Katz LLC (57) ABSTRACT

A method comprising receiving a candidate image, including a first field, a second field, a first data element, and a second data element. The processor receives a definition of first and second form zones. The processor evaluates the first data element to determine a first measure of a similarity and the second data element to determine a second measure of a similarity. The processor computes a similarity value indicative of an overall similarity, iteratively compares the overall similarity to a previous iteration, modifies the positions of the form zones, and repeats the evaluating and computing based on the modified positions until the computed similarity value meets a threshold.

20 Claims, 7 Drawing Sheets

COMPENSATION FOR PRINT SHIFT IN STANDARDIZED FORMS TO FACILITATE EXTRACTION OF DATA THEREFROM

TECHNICAL FIELD

The present disclosure relates generally to a system and method for compensating for print shift in standardized forms.

BACKGROUND

Standardized forms are used in many industries (insurance, health care, government, etc.). Document receiving/processing organizations often receive vast quantities of completed, e.g. filled in, printed forms from users, such as health care insurance forms, investment account forms, magazine subscription forms, change of address forms, and generally forms utilized to collect, provide and/or submit customer or client information. A received form may be thought of to include two distinct types of information: (1) predefined/underlying typographic and directional information of the form itself, e.g. instructions for filling in the form, field designators, such as boxes or lines, and field names such as "name" and "address", which specify the purpose of the form and/or direct what type of, and where, information is to be provided, and (2) any hand, typewritten, or printed information subsequently provided or added to the form, such as by a user or someone other than the form's creator/designer. The document receiving organization typically scans the received form and generates an electronic image, if not received as an electronic image, containing both types of information. From these electronic images, the user added information is typically extracted, such as via optical character recognition, for subsequent processing, such as storage in a database.

The extraction process, which may distinguish between the form and the user information added thereto, may be complicated by artifacts on the form such as stray marks, tears, coffee stains, etc. Furthermore, while forms may be filled out by hand with a pen or pencil, it is common to feed pre-printed forms through a typewriter or computer printer so as to fill in the requisite information. In some instances, the form, along with the user added information, is entirely computer generated and printed to a blank sheet of paper in a single operation. Any time one of these forms is fed to a typewriter, printer or scanner in order to electronically fill in the requisite information, or where the form and information are printed together on to a blank sheet, there is a chance the form will not be aligned correctly with the device or the entered data which results in the entered data appearing unaligned with the locations designated to receive that data, referred to as "print shift," which may impact the ability of the document processing organization to electronically process the document image of that form to extract the user added information. For example, the shifted data may overlay elements of the form making it difficult to electronically distinguish the user added data from the form elements, the shifted data may be ambiguously positioned relative to multiple form elements making it difficult to electronically identify the nature of the information, e.g. to which field it belongs, or the user data may be out of position with respect to the locations on the form where the electronic extraction process expects to find the user added data, impeding or otherwise rendering the extraction process inoperable. All of these situations may result in reduced accuracy, reduced efficiency and/or the need for operator intervention in an otherwise automated process which may decrease efficiency and increase cost.

DETAILED DESCRIPTION

The disclosed embodiments are directed to compensating for print shift in standardized forms by providing a pre-defined form extraction zone template defining regions or zones corresponding to the fields of the form in which user added data is expected to be found, iteratively analyzing the alignment of user added data to a particular form with respect to each region of the form extraction zone template, and assigning a score thereto and calculating an overall alignment score based on the scores for each region. With each iteration, zones of the form extraction zone template are modified, e.g. shifted left, right, up or down, with respect to user added data and the scoring is repeated until the optimal page alignment score, e.g. the lowest, is achieved.

Standardized forms (or other document images) are typically processed using automated technologies to read the forms and any fields that have been entered. In an ideal situation, data is entered (scanned, inputted, read) into a form correctly, i.e. positioned with respect to the form elements in an unambiguous and clear manner; e.g. not only within the right box, but also within the boundaries of that box, above a line, between designators or other markings or indicators, etc. In such a case, automated technologies are not required to make a determination if the data read or scanned is actually the correct data associated with a particular form field. In particular, to improve the efficiency of the data extraction process, a template may be defined with regions, zones or areas of the form document in which user added data for a given form document may be expected to be found. These data extraction templates may be pre-defined based on a blank form provided in advance to the operator of the document processing facility or based on one or more sample completed forms having been received thereby. Using the data extraction template, the document processing system need only perform the data extraction processes for a given form document, or image thereof, with respect to the defined zones rather than the entire document, saving time, resources, cost, etc. Furthermore, the defined extraction zones may be associated with data defining the context of the information expected to be found at each location of the form. This may then be used to automate the subsequent processing of the extracted data such as the process for converting the extracted data to a computer readable form, e.g. using OCR or image recognition, storage of the extracted data, such as in the correct database field or location, or otherwise automatically contextualize the extracted data for subsequent processing.

Incorrect form alignment may arise for many reasons and may complicate the use of data extraction templates. Incorrect form alignment, referred to herein as "print shift," is where the user added data does not align properly with the form fields, and therefore may not align with the data extraction template. Two exemplary sources of such misalignment are incorrect configuration for form alignment in the software used to generate the data or physical factors or alignment of the form document with respect to a device through which it is processed, e.g. a typewriter, a printer, or a scanner. When a form is later processed by a company, entered data may not align up with an associated form element, e.g. box or field. This is less than desirable as it inhibits successful use of automation technologies, e.g. data extraction templates, and human intervention may be required to successfully process the form.

For automated technologies using methods such as optical character recognition (OCR) or sending individual snippets or portions of the document to a person for transcription (instead of the whole document), "print shift" may cause the data for a given field to be cut off resulting in issues with the OCR output or potentially producing blank responses to fields.

Figure 1:
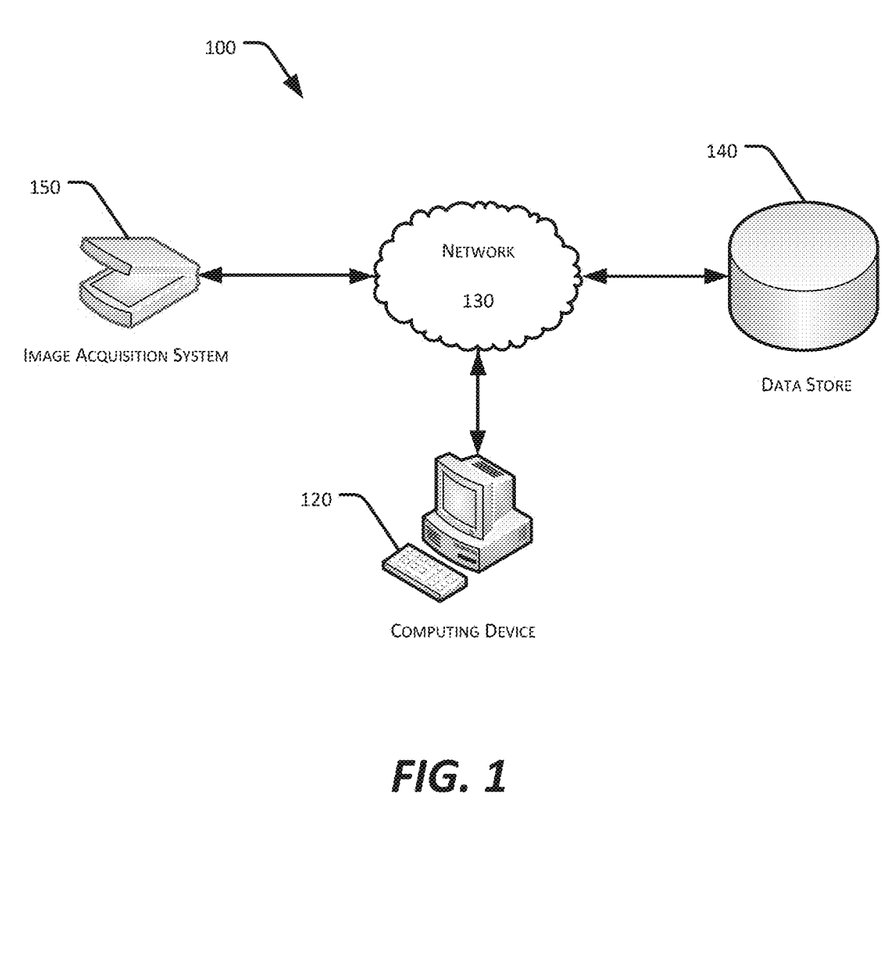
FIG. 1 is a general overview of a system for compensating for print shift.

FIG. 1 provides a general overview of a system 100 for compensating for print shift in standardized forms. Not all of the depicted components may be required, however, and some implementations may include additional components. Variations in the arrangement and type of the components may be made without departing from the spirit or scope of the claims as set forth herein. Additional, different or fewer components may be provided to increase or alter the capabilities of the system 100.

The system 100 may include a computing device 120, a network 130, a data store 140, and an image acquisition device 150. The computing device 120, in this embodiment, displays and provides an operator interface for use by an operator. The image acquisition device 150 may be used to create one or more candidate or electronic document images from one or more paper documents containing typographic information corresponding to a form and handwritten, typed, or printed information provided by a form filer. Alternatively, or in addition to, the image acquisition device 150 may receive candidate or candidate images from other sources or terminals connected through the network 130. For example, the image acquisition device 150 may be a facsimile machine configured to receive image information from the computing device 120 or another facsimile machine via telephone network or other network 130.

The typographic information of each candidate, candidate image, or electronic document image corresponds to typographic information of forms of varying document types that are received by the system 100. The typographic information may be information printed, or applied, to the medium by a machine, such as an inkjet or laser printer. The typographic information may be identified by one or more characteristics, such as typeface, color, point size, line length, leading space, tracking space and kerning space. The typographic information may indicate where handwritten or other user supplied information, or indicia thereof, should be applied to the medium using lines, boxes or other indicators that provide visual cues to where handwritten information should be provided. The handwritten information may be applied to the medium using a writing implement, such as a pen, pencil, stylus, marker, crayon or other writing instruments. The writing implement, in another embodiment, may be a handheld device for applying information on a medium that may create a smooth, controllable line. In other embodiments, the user supplied information may be provided using a typewriter, a laser printer or other mechanical or electromechanical means.

The image acquisition device 150 may be a device capable of converting information contained on the medium into an electronic document image or otherwise receiving electronic document images from another source, such as from a storage device or via a wired or wireless network. For example, the image acquisition device 150 may be a scanner or other digital image capture device. The image acquisition device 150 communicates with the computing device 120 and the data store 140 through the network 130. Alternatively, or in addition to, the image acquisition device 150 may be in direct communication with one or more of the computing device 120 or the data store 140 utilizing a wired connection such as a universal serial bus (USB) connection, a serial connection or other known or later developed connection scheme or protocol. In yet another embodiment, the image acquisition device 150 may be combined with or include elements of the computing device 120 or the data store 140. For example, the image acquisition device 150 may be a handheld device with a camera that may capture an image of a document, such a smartphone or tablet including a camera or generally any handheld device capable of generating an electronic document image from a physical document. The image acquisition device 150 may introduce variations in the candidate image, such image skew, image noise, or any other visual artifacts.

The data store 140 may be operative to store data relating to the candidate, candidate images and/or electronic document information such as transformations of the electronic document images, the typographic information, the document type characterizing an electronic document image, or any other data related to the system 100. The other data related to the system 100 may include information describing known exemplars, such as electronic document images depicting blank forms used by the organization. For example, the data store 140 may store a set of models and patterns describing each exemplar. Models may include a fingerprint for a given exemplar and a mapping between model points and image points which allows for modification or adjustment of the electronic document image based on a determined rotation, translation and scale. The data store 140 may contain data extraction templates.

The data store 140 represents one or more relational databases or other data store 140s managed using various known database management techniques, such as, for example, SQL and object-based techniques. The data store 140 implements using one or more magnetic, optical, solid state or tape drives, or other storage mediums available now or later developed.

In this embodiment the data store 140 is shown in communication with the computing device 120 via the network 130. In this configuration, the data store 140 implements as a database server running MICROSOFT SQL SERVER®, ORACLE®, IBM DB2® or any other database software. The data store 140 may further be in communication with other computing devices and servers through the network 130.

The network 130 may include wide area networks (WAN), such as the Internet, local area networks (LAN), campus area networks, metropolitan area networks, or any other networks that may facilitate data communication. The network 130 may be divided into sub-networks that allow access to all of the other components connected to the network 130 in the system 100. Alternatively, the sub-networks may restrict access between the components connected to the network 130. The network 130 may be configured as a public or private network connection and may include, for example, a virtual private network or an encryption scheme that may be employed over the public Internet.

The computing device 120 may be connected to the network 130 in any configuration that supports data transfer. These configurations include both wired and wireless data connections to the network 130. The computing device 120 may further run a web application on any platform that supports web content, such as a web browser or a computer, a mobile phone, personal digital assistant (PDA), and/or any appliance or device capable of data communications.

The computing device 120 may be a machine that has a processor 202, memory 204, a display, a user interface and a communication interface, such as the computing device described in FIG. 2 below. The processor 202 may be operatively coupled with the memory 204, display and the interfaces and to perform tasks at the request of the standalone application or the underlying operating system. Herein, the phrases "coupled with" and "connected to" are defined to mean directly connected to or indirectly connected through one or more intermediate components. Such intermediate components may include both hardware and software based components.

The memory 204 represents any hardware configuration capable of storing data. The display operatively couples to the memory 204 and the processor 202 in order to display information to the operator. The user interface, in turn, is stored in the memory 204 and executed by the processor 202 for display via the display. The user interface provides a mechanism by which an operator may interact with the system and matching program and algorithm. From the above descriptions, it is to be inferred that the system and method for candidate identification is highly adaptable and configurable. The flexible nature of the disclosed system and method allow for a wide variety of implementations and uses for the discussed and disclosed technology and algorithms.

Herein, the phrase "operatively coupled" is defined to mean two or more devices configured to share resources or information either directly or indirectly through one or more intermediate components. Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The communication interface may be operatively coupled with the memory 204, and the processor 202, and may be capable of communicating through the network 130 with the image acquisition device 150. The standalone application may be programmed in any programming language that supports communication protocols. Examples of these languages include: SUN JAVA®, C++, C#, ASP, SUN JAVASCRIPT®, asynchronous SUN JAVASCRIPT®, or ADOBE FLASH ACTIONSCRIPT®, amongst others.

The computing device 120 may be any mobile device that has a data connection and may run a mobile application. The data connection may be a cellular connection, a wireless data connection, an internet connection, an infra red connection, a Bluetooth connection, or any other connection capable of transmitting data. For example, the mobile application may be an application running on an iPhone™ available from Apple, Inc.

Figure 2:
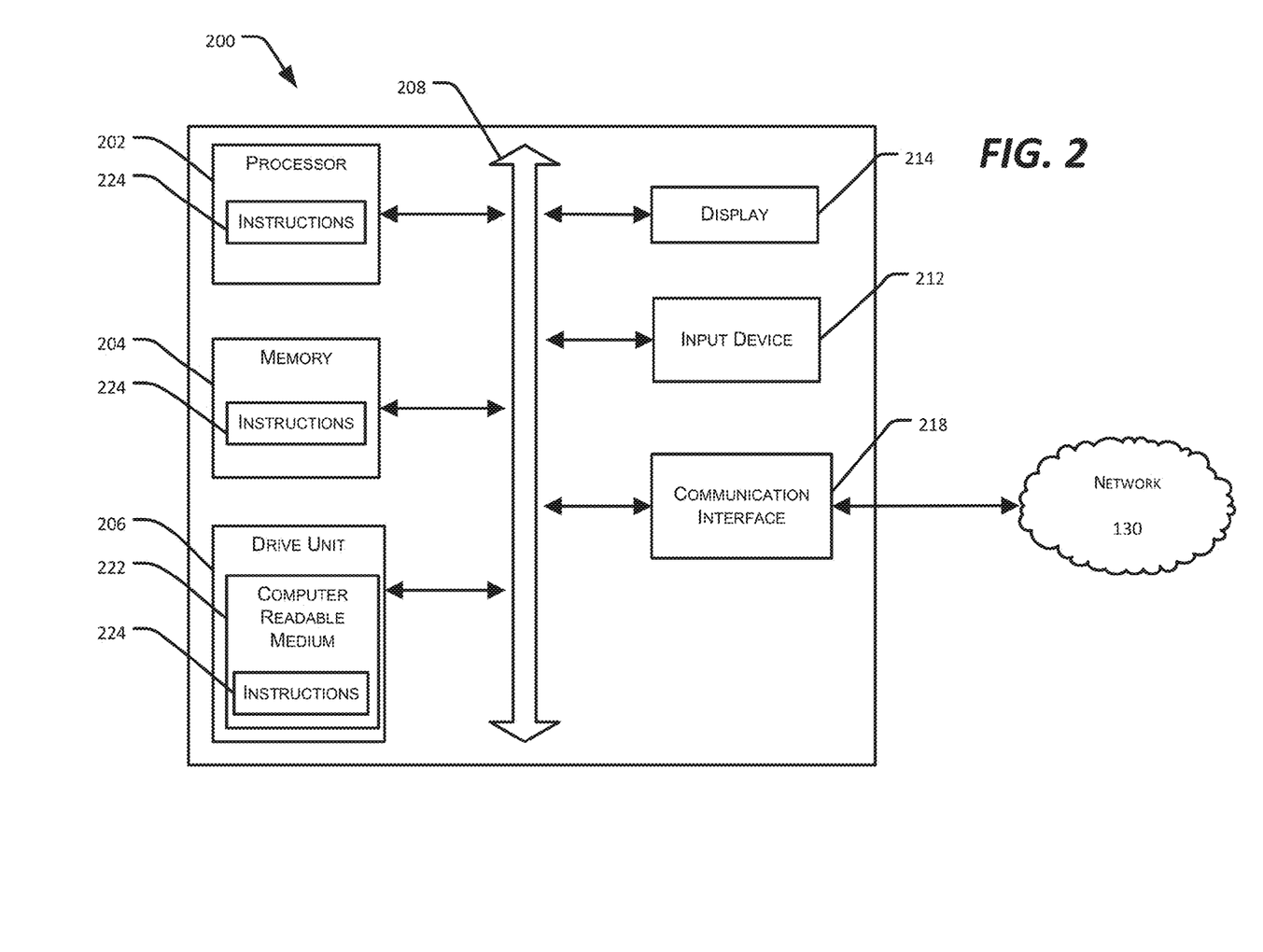
FIG. 2 illustrates a general computer system that may be used in the system of FIG. 1, or other systems for compensating for print shift.

FIG. 2 illustrates a general computer system 200 such as the computing device 120, or any of the other computing devices referenced herein. The computer system 200 stores and executes an algorithm or a set of instructions 224 to cause the performance of any one or more of the methods or computer based functions discussed and disclosed in this patent document. The computer system 200 may operate as a standalone device or may be connected to other computer systems or peripheral devices.

In a networked deployment, the computer system 200 may operate in the capacity of either a server or a client computer in a server-client network environment, or as a peer computer system in a peer-to-peer (or distributed) network environment. The computer system 200 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 224 (sequential or otherwise) that specify actions to be taken by that machine. In a particular embodiment, the computer system 200 may be implemented using electronic devices that provide voice, video or data communication. Further, while a single computer system 200 may be illustrated, the term "system" shall also be taken to include any collection of systems or sub-systems that individually or jointly execute a set, or multiple sets, of instructions to perform one or more computer functions via the network 130.

As illustrated in FIG. 2, the computer system 200 includes a processor 202, such as, a central processing unit (CPU), a graphics processing unit (GPU), or both. The processor 202 may be a component in a variety of systems. For example, the processor 202 may be part of a standard personal computer or a workstation. The processor 202 hardware may incorporate one or more general processor 202s, digital signal processor 202s, application specific integrated circuits, field programmable gate arrays, servers, networks, digital circuits, analog circuits, combinations thereof, or other now known or later developed devices for analyzing and processing data.

The computer system 200 may include a memory 204 that may communicate via a bus 208. The memory 204 may be divided or segmented into, for example, a main memory, a static memory, and a dynamic memory. The memory 204 includes, but may not be limited to, computer readable storage media and various types of volatile and non-volatile storage media such as: random access memory; read-only memory; programmable read-only memory; electrically programmable read-only memory; electrically erasable read-only memory; flash memory; magnetic tape or disk; optical media and the like. In one case, the memory 204 includes a cache or random access memory for the processor 202. Alternatively, or in addition to, the memory 204 may be separate from the processor 202, such as the system memory.

The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data.

The memory 204 is configured to store instructions 224 executable by the processor 202. The functions, acts or tasks illustrated in the figures or described herein may be performed by the programmed processor 202 executing the instructions 224 stored in the memory 204. The functions, acts or tasks may be independent of the particular type of instructions set, storage media, processor 202 or processing strategy and may be performed by software, hardware, integrated circuits, firm-ware, micro-code and the like, operating alone or in combination. Likewise, processing strategies may include multiprocessing, multitasking, parallel processing and the like.

The computer system 200 may further include a display 214, such as a liquid crystal display (LCD), an organic light emitting diode (OLED), a flat panel display, a solid state display, a cathode ray tube (CRT), a projector, a printer or other now known or later developed display device for outputting determined information. The display 214 acts as an interface for the user to see the functioning of the processor 202, or specifically as an interface with the software stored in the memory 204 or in the drive unit 206.

The computer system 200 further includes an input device 212 configured to allow a user to interact with any of the components of system 200. The input device 212 may be a number pad, a keyboard, or a cursor control device, such as a mouse, or a joystick, touch screen display, remote control or any other device operative to interact with the system 200.

The computer system 200, in other embodiments, includes a disk or optical drive unit 206 to accessibly interpret computer-readable medium 222 on which one or more algorithms or set of instructions 224, e.g. software, is embedded. The algorithms or instructions 224 perform one or more of the methods or logic as described herein. The algorithms 224 may reside completely, or at least partially, within the memory 204 and/or within the processor 202 during execution by the computer system 200. The memory 204 and the processor 202 also may include other forms or configurations of computer-readable media as discussed above.

The present disclosure contemplates a computer-readable medium 222 that includes instructions 224 or receives and executes instructions 224 responsive to a propagated signal; so that a device connected to a network 130 may communicate voice, video, audio, images or any other data over the network 130. Further, the instructions 224 may be transmitted or received over the network 130 via a communication interface 218. The communication interface 218 may be implemented in software or may be a physical connection in hardware. The communication interface 218 provides a connection with the network 130, external media, the display 214, or any other components in system 200 or combinations thereof. In one embodiment, the connection with the network 130 is a physical connection such as a wired Ethernet connection or may be established wirelessly such as via a cellular telephone network, an 802.11, 802.16, 802.20, or WiMax network. The network 130 in other embodiments may be a public network, such as the Internet, a private network, such as an intranet, or combinations thereof, and may utilize a variety of networking protocols now available or later developed including, but not limited to TCP/IP based networking protocols.

The computer-readable medium 222 may be a single medium or may comprise multiple mediums such as a centralized or distributed database and/or associated caches and servers that store one or more sets of instructions. The term "computer-readable medium" is generally utilized to describe any medium that may be capable of storing, encoding or carrying an algorithm or set of instructions for execution by a processor 202 or that may cause a computer system to perform any one or more of the methods or operations disclosed herein.

The computer-readable medium 222 may include a solid-state memory such as a memory card or other package that houses one or more non-volatile read-only memories. The computer-readable medium 222 further includes or encompasses random access memory or other volatile re-writable memory. Additionally, the computer-readable medium 222 may include a magneto-optical or optical medium, such as a disk or tapes or other storage device to capture carrier wave signals such as a signal communicated over a transmission medium. A digital file attached to an e-mail or other self-contained information archive or set of archives may be considered a distribution medium that may be a tangible storage medium. The present disclosure may be considered to include any one or more of a computer-readable medium or a distribution medium and other equivalents and successor media, in which data or instructions may be stored.

In other embodiments, dedicated hardware implementations, such as application specific integrated circuits, programmable logic arrays and other hardware devices, may be constructed to implement one or more of the methods described herein. Applications that include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

Figure 3:
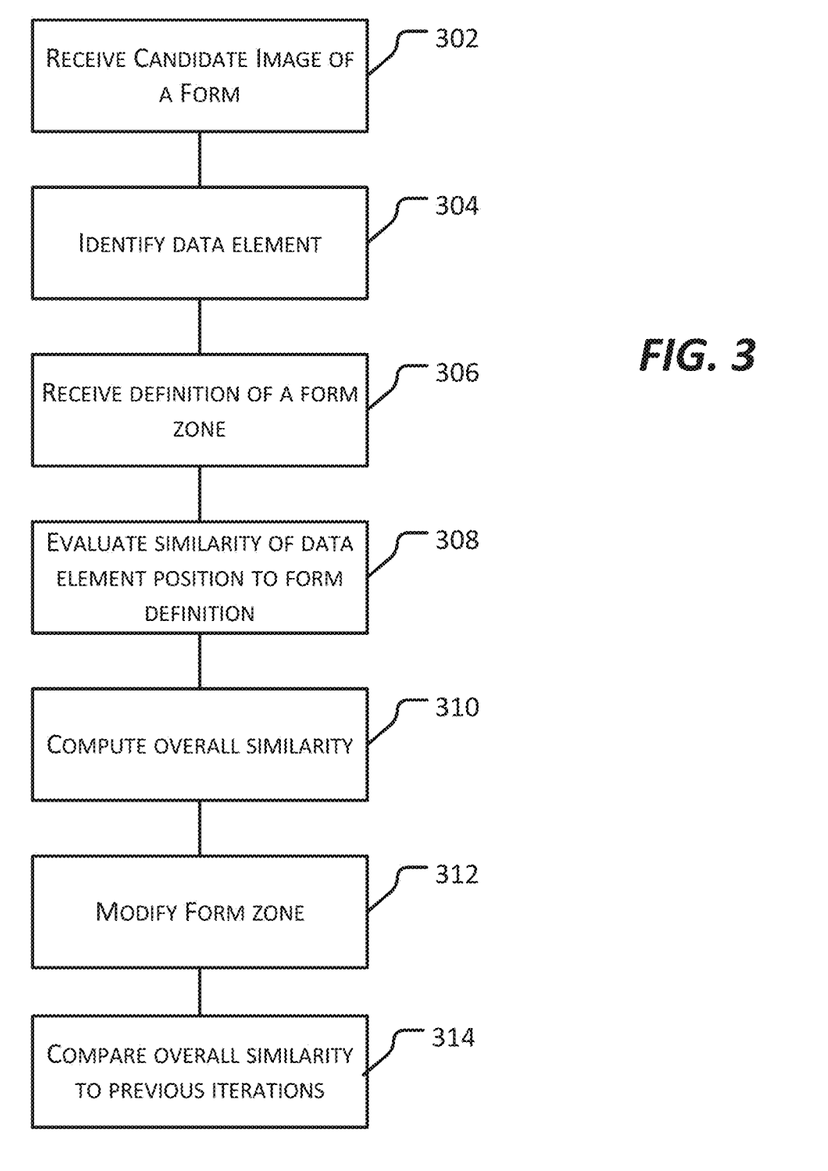
FIG. 3 is a flowchart illustrating the acts or processes implemented to compensate for print shift.

FIG. 3 illustrates a flow chart of an example embodiment for compensating for print shift in standardized forms. As presented in the following sections, the acts may be performed using any combination of the components indicated in FIG. 1 or FIG. 2. The following acts may be performed by a system 100, a computer system 200, a computing device 120, a processor 202, instructions 224 or a combination thereof. Additional, different, or fewer acts may be provided. The acts are performed in the order shown or other orders. The acts may also be repeated.

The system 100 and the computer system 200 are configured to implement an exemplary print shift compensation method encoded and represented by the instructions 224 and executable by the processor 202.

At act 302, the processor 202 receives a candidate image from the image acquisition device 150 (302). A candidate image may consist of one or more pixels. A pixel may be the smallest addressable element in an all points addressable image. A pixel may be addressed by the pixel's physical location on a page or image indicated by the pixel's coordinates (NY). A pixel may be addressed using a different system depending on if the pixels are arranged in a regular, staggered, or other grid. A pixel may be the smallest controllable element of an image such as a candidate image.

Figure 4A:
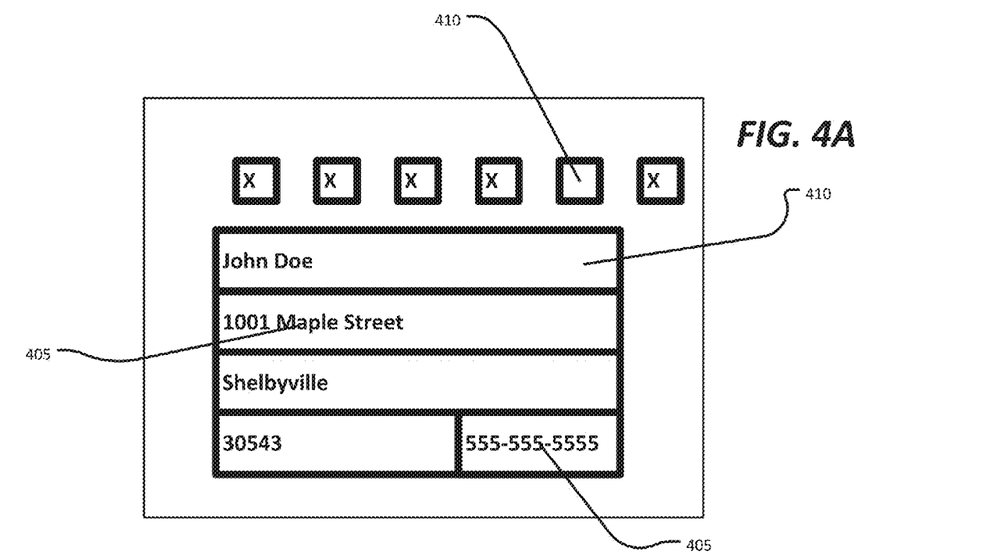
FIGS. 4A and 4B illustrate standardized forms.
Figure 4B:
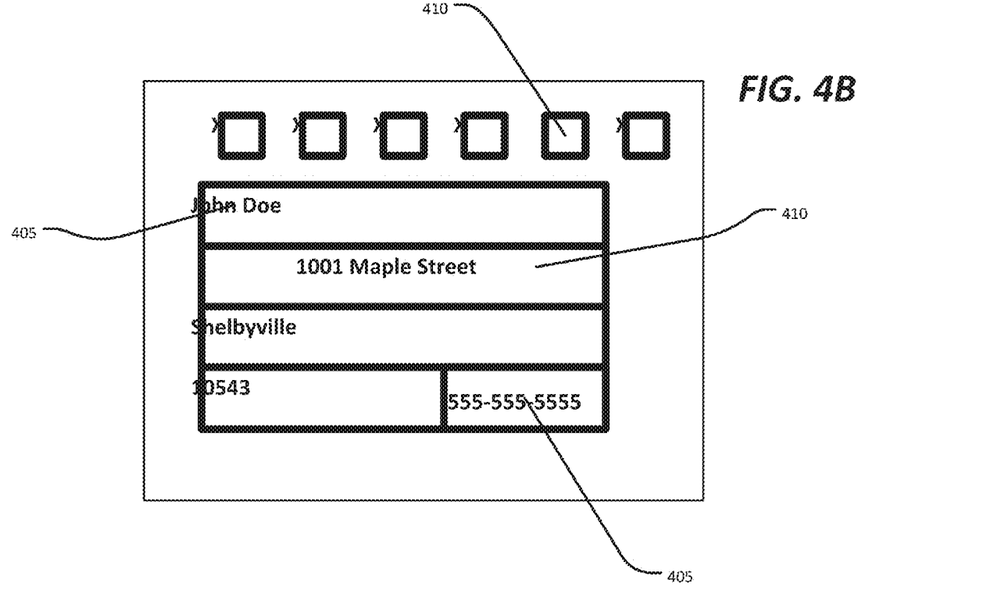

FIGS. 4A and 4B illustrate example candidate images. A candidate image may include underlying typographic information, e.g. identifiers such as name, address, or areas indicating input areas such as boxes, lines, etc. A box, rectangle, polygon or set of lines or grids (or other area for inputting data) may be referred to a field or data field. FIG. 4A illustrates several fields 410 for inputting data. The typographic information of each candidate image may correspond to typographic information of forms of varying document types that are received by the system 100. The typographic information may be information printed, or applied, to the medium by a machine, such as an inkjet or laser printer. Typographic information may be pre-printed on a standardized form. The typographic information may be identified by one or more characteristics, such as typeface, color, point size, line length, leading space, tracking space and kerning space. The typographic information may indicate where handwritten or other user supplied information, or indicia thereof, should be applied to the medium using lines, boxes or other indicators that provide visual cues to where data is to be provided.

A candidate image may include hand, typewritten, or printed information provided or added to the form by a user. This information may be referred to as data elements. An example form in FIG. 4A has multiple data elements 405 (inputted characters/words). A data element may be entered by hand or by a machine. The handwritten information may be applied to the medium using a writing implement, such as a pen, pencil, stylus, marker, crayon or other writing instruments. In other embodiments, the data element may be provided using a typewriter, a laser printer, an ink jet printer, or other mechanical or electromechanical means. A data element may also be entered digitally though a user interface on a computing device. In an ideal situation data elements will be aligned with a location designated to receive the data, typically within the associated field.

The example form illustrated by FIG. 4B has been printed or received in error as the data elements 405 do not match up with the fields 410. During normal operation, a form may be scanned or read using optical character recognition (OCR). The data elements extracted by OCR is then matched up with the expected field and potentially stored together in a database for later use. When data elements are print shifted, this is less than desirable as it inhibits successful use of automation technologies and as such, human intervention may be required to successfully process the form.

At act 304, the processor 202 evaluates the candidate image to determine positions/locations of the data elements. The candidate image may include multiple fields (or typographical data) and multiple data elements. A data element may comprise one or more pixels; pixels that may have coordinates such as (NY). In one example, the received candidate image may be subjected to pixel-by-pixel image processing in order to identify the data elements. When evaluating the candidate image, the processor 202 may identify a pixel as typographical data or a data element or neither. This identification along with other pixel attributes may be stored in memory or the data store 140.

Identification of typographical data and/or data element may be done using multiple methods. Three examples of these methods are dropout ink, identifying a form template, or identifying form features. FIG. 5B illustrates a method of identifying the typographical data and data elements. The dotted line represents the boundaries of each field 520 within the candidate image. When pixels that represent the underlying typographic information of the form are identified (including the field lines and any description), the pixels may be removed leaving only the data elements 505 as shown in FIG. 5C.

The drop out ink method may be used if the candidate image was created or generated on a form with an identifiable color or trait. This allows a scanner or input device to drop out (ignore) a single configurable color and with it, the form/fields, but leaves the data elements behind Using a drop out ink method, each pixel that displays the configurable color is identified as being part of one or more fields or typographical information. Any pixel that does not display the configurable color may be identified as part of one or more data element(s), e.g. data added later on.

Another way to identify typographical data and/or data element is by identifying the form being used, e.g. by reference number. One such way to perform this separation is to match a pre-defined template of a "model" form to the instance of the form where the data is printed. Once the document has been matched, the processor 202 may use the master template as a guide to remove the pixels corresponding to its underlying typographic information (the original text and lines of the form) leaving just the data elements.

Another way to identify typographical data and/or data element is by identifying the form features of the candidate image. The processor 202 may identify which features of the image are intrinsic to an original form and which were added or entered by a printer or user. Pixels corresponding to the original form features are identified in the candidate image. The pixels may be removed from the candidate image. The remaining pixels may be used to identify the data element(s).

The processor 202 may use a fingerprint method to identify a form and/or form features and therefore the typographical data. The processor 202 generates a fingerprint representing the candidate image by identifying pixels in the candidate image. The algorithm compares the generated fingerprint with one or more stored models or exemplars of typographical information contained within forms stored within the memory 204. The models or exemplars represent a fingerprint based on the typographical information of a blank form and further include other identifying information such as a form name, an identification number, a page number or other identification information. In other instances, the model or exemplar may be based on the information gathered from a form that contains user provided information and data.

The models or exemplars utilized by the algorithm are typically generated offline or separately from the correction and fingerprint generation algorithms. However, the generation and creation of exemplar fingerprints will typically be accomplished in a manner similar to the one discussed and disclosed herein. For example, the exemplar image may be a high-quality or high-resolution digital document format or image (e.g., jpeg or PDF) of a blank form. Alternatively, the exemplar image may be based on scan of a form that contains user information, marks or other data. The exemplar image may be created by a user using a graphical tool.

In order to identify a form corresponding to the candidate image, a pattern matching procedure that compares the individual points of the fingerprint representing the candidate image to the points of a fingerprint representing the exemplar is utilized. As will be understood, the greater the number of points matched between two fingerprints the better the quality of the overall match. The quality of the match may be expressed as a score ranged between 0 and 1000. For example a score of 1000 indicates a 100% match between the two fingerprints while a score of 700 represent a 70% match. Moreover, the stored lengths of the text line and text line-like components may be compared to the lengths of the text line components contained within the exemplar(s). If, for example, the length of the text line components is determined to be within twenty percent (20%) of the length of the length of the exemplar's text line components, then the two may be considered to be matched.

Once the form has been identified, the processor 202 is able to identify which pixels correspond to the original fields. The processor 202 may send a request to the data store 140 to access the locations of the form zones on a known standardized form. Using the fingerprint method mentioned above, the processor 202 may be able to identify the candidate image as a standardized form and therefore identify one or more form zones from the form database 140. Using these or other methods allows the processor 202 to determine which data (pixels) represent the underlying typographic information of the form. The underlying typographic information pixels may also be removed to identify the data element(s). The data may then be further processed to identify additional attributes of the data elements.

The processor 202 may break up the pixels of the data element(s) on the page into words or other groupings. This may be done with Optical Character Recognition (OCR), or by using a connected components algorithm (CCA). The processor 202 using OCR may use a pattern based algorithm to identify characters or symbols. The processor 202 may use a pixel by pixel analysis. A data element may be split into two separate data elements if the pattern recognition determines that the data element is part of two separate fields.

At act 306, the processor 202 receives definitions of first and second form zones. Form zones, or extraction zones, may be defined manually for each field where data (data elements) may be entered on a form. Form zones may be created when the form is created by using a graphical tool to define extraction zones or regions where data is expected to be inputted. A user indicates using the graphical tool (or another input) an area (box, grid, boundary etc.) which is intended to receive or prompt the input of a data element by a second user (or machine). A form zone may be identical in area to the boxes or rectangles or field on a form or it may encompass more or less area. For example, a form zone may be larger than a field on a form if the expectation that data elements may stray outside the box (such as in handwritten forms). Form zones may be created when the standardized form is created or a form zone may be defined at a later point. The form zones for a standardized form (or other form) is the region or area where automated technologies expect the data elements to be. A form zone may encompass multiple fields or be limited to a single field. Form zones may be created and stored along with attributes such as the field name, size, or field type which correspond to the expected data element. Form zones may be stored with the candidate image or separately in memory as a data extraction template in the database 140. A form zone may be defined by the pixels and/or the pixel coordinates that are included in the form zone. A form zone may also be defined by a boundary or a polygonal region. A form zone may also be defined by a positional relationship with typographic information in a candidate image.

Form zones serve several purposes. Primarily, form zones allow automated technologies to match up data elements with expected fields. Form zones are also useful by limiting the amount of data that is scanned or collected from a candidate image. Instead of having to scan (OCR) an entire form, automated technologies may limit a scan to a particular form zone. This cuts down both on processing time and storage required to read a document as it allows a processor to focus in on particular regions, areas, or zones which may be important.

Figure 5A:
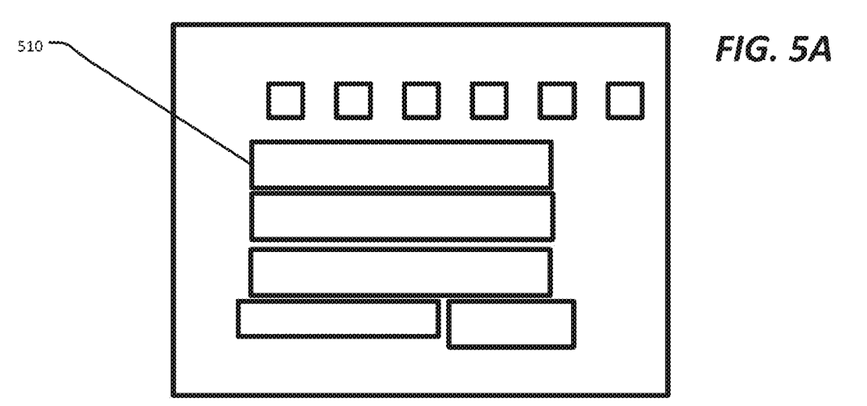
FIGS. 5A, 5B, and 5C illustrate form zones and data elements.
Figure 5B:
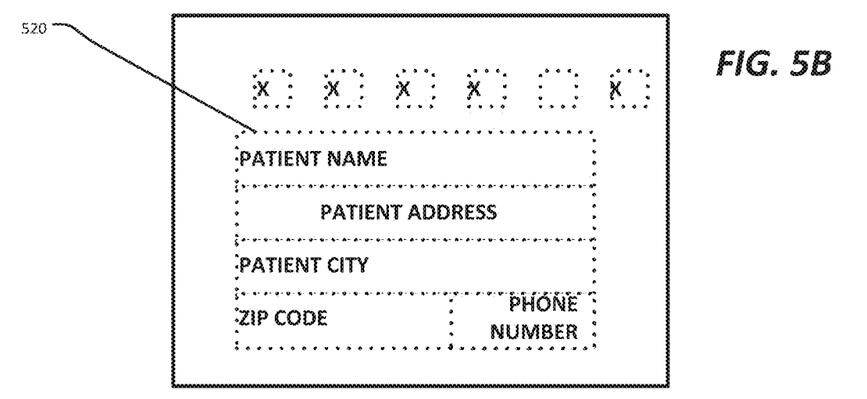
Figure 5C:
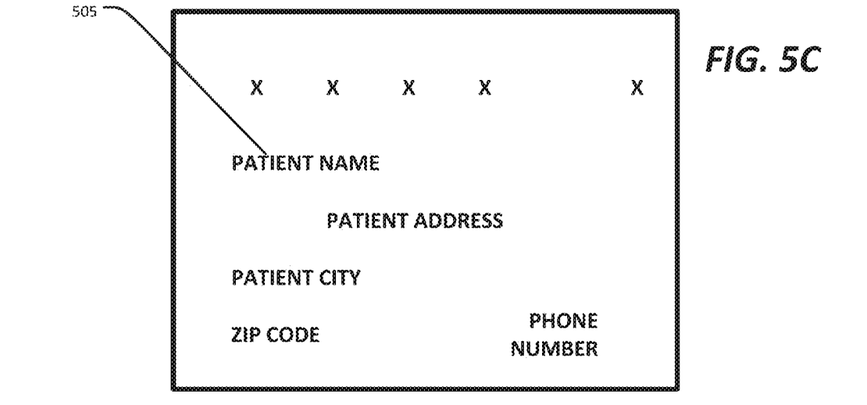

FIG. 5A illustrates form zones 510 that were created to capture data elements in the fields. The form zone 510 created by the user may be made up of one or more pixels which correspond to the form zone's location on a viewable image. The pixels may be arranged as a polygon such as a square, rectangle, triangle, etc. The form zone 510 may be represented as a boundary line which encompasses all pixels on the interior of the boundary. A form zone may also represented negatively, e.g. the date element may be located outside the boundary line.

At act 308, the processor 202 determines the similarity of the positions of the data elements with the respective positions of the form zones. The similarity of the positions may be represented by an element alignment score. To determine the similarity or score for each data element, the processor 202 may first associate each data element with a form zone. Data that was collected from the OCR process may be stored in memory 204. This additional data may be analyzed to indicate that the data element is a word, a symbol, or other character or set of characters. The additional data may also indicate data element attributes such as expected type. The form zone definition (area/boundaries) may also be stored in memory 204. The processor 202 may calculate a size and purpose for the form zone. For example, a form zone that is only 20 pixels wide may be used as a check box versus a form zone that is 200 pixels wide which may be used for an address. A data element that consists of ten numerical digits may be recognized as a phone number. The processor 202 may access the form database 140 to obtain matches for form zones that have been previously inputted. The form database 140 may contain samples and examples of form zones and their intended use.

The processor 202 uses both the definition (position) of the form zone and data element along with any additional attributes (e.g. from the associated fields) to associate one with the other. Due to print shift, a data element may plausibly be associated with more than one form zone. A data element may be shifted far enough from the data element's expected field and form zone that it may appear to belong to a separate field/form zone.

In an example embodiment, there may be exactly the same number of data elements and form zones. There may be situations where this is not the case. The candidate image may contain one or more blank fields (and therefore blank form zones). Fields may not be filled out (or purposely left blank) and therefore not expected to have an associated data element. A single data element may be mistakenly identified as two or more data elements (for example when entering a city/state combination). In an example where there is not an clear form zone for a data element, the processor 202 will select the best fit form zone, but may also associate additional form zones as alternatives form zones for the data element. A best fit form zone will depend on the address and attributes of the data element(s) and form zone(s).

Once a data element is associated with a form zone, the processor 202 evaluates how well the data element(s) are aligned to the form zone(s). If the processor 202 use a zero based similarity scoring (where zero represents good alignment), the processor 202 may then say that if all of the data element is within the form zone, an element alignment score is zero.

A data element may have a zero element alignment score in two ways. The first is if it is fully contained within a zone (the mathematics may lead to this—see below). The other is if it is not contained within a zone at all. Although the mathematics of the formula dictates that a zone that does not intersect the target zone will have an element alignment Score=1, the processor 202 may arbitrarily set all of these element alignment Scores to zero when calculating the page alignment score. There may be data elements on the page that don't belong to any form zone, which would skew the score.

Figure 6A:
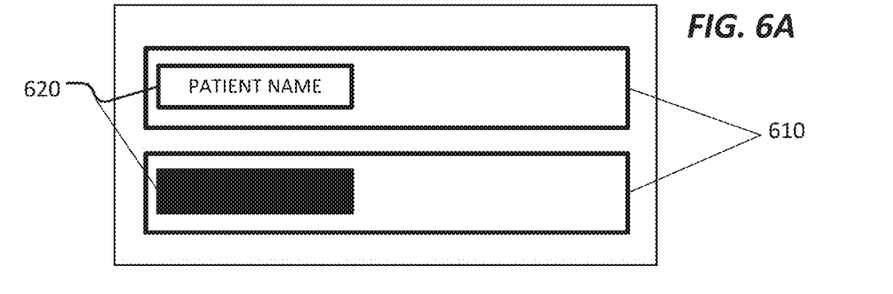
FIGS. 6A, 6B, and 6C illustrate form zones and data elements.
Figure 6B:
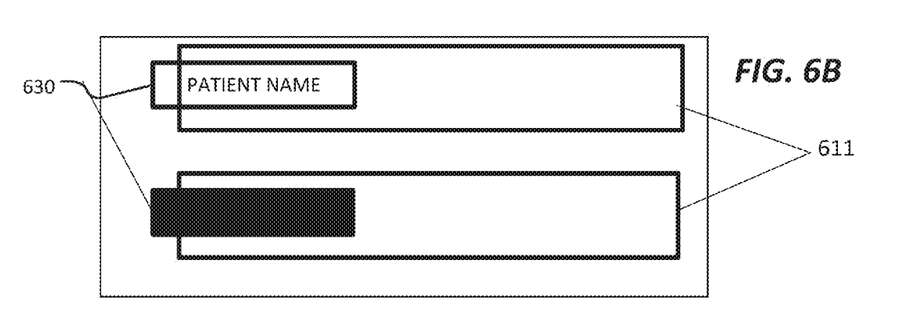
Figure 6C:
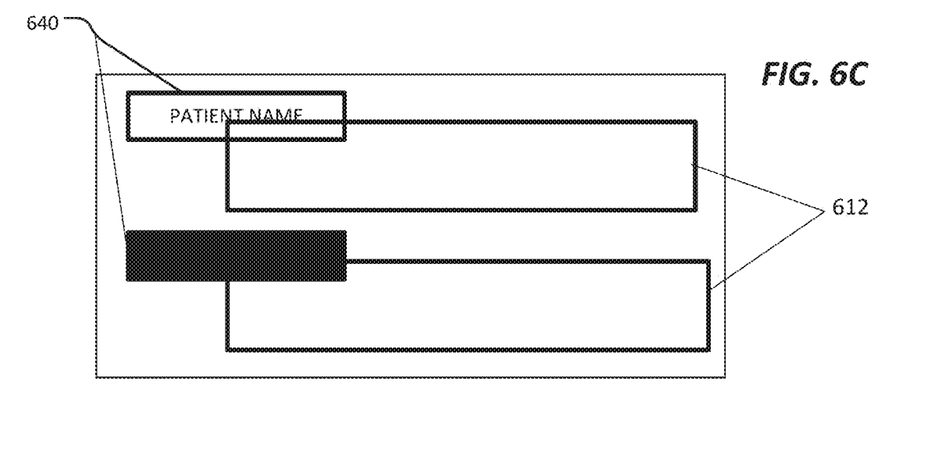

The processor 202 may generate a score if the data element is not aligned. If a form zone has a data element that is halfway out of the form zone, the scoring algorithm prefers the form zone to have a higher score than a form zone that has a data element with a small amount of pixels outside of the form zone. The scoring algorithm defines an element alignment score as:

Element Alignment Score=(Element Area−Element Area Inside of Zone)/Total Area of Element.    EQUATION 1:

FIGS. 6A, 6B, and 6C illustrate data elements and form zones. FIG. 6A illustrates a data element 620 and a form zone 610 which are properly aligned. 100% of the data element 620 is inside of the form zone 610. For this example, the area of the data element totals 1000 pixels. The element alignment score using equation 1 would be (1000−1000)/(1000) or a perfect zero score.

FIG. 6B illustrates a data element 630 and a form zone 611 which are slightly out of alignment. Approximately 85% of the data element 630 is inside the form 611 zone. For this example, the area of the data element totals 1000 pixels. The element alignment score using equation 1 would be (1000−850)/(1000) or 0.15.

FIG. 6C illustrates a data element 640 and a form zone 612 which are very out of alignment. Only approximately 20% of the data element 640 is inside the form zone 612. For this example, the area of the data element totals 1000 pixels. The element alignment score using equation 1 would be (1000−200)/(1000) or 0.80.

At act 310, the processor determines an overall score of similarity for the data elements in the candidate image. The overall score or page alignment score may be calculated once each data element has had an element alignment score calculated. A page alignment score may be a representation of how well one or more data elements are aligned with one or more form zones. The page alignment score may be an aggregation of multiple element alignment scores (for each data element contained on a candidate image). An element alignment score may be a representation of how well a particular data element aligns with an associated form zone. If just one data element is misaligned, the processor 202 want the page alignment score to be lower than if multiple data elements are misaligned. The processor 202 may define an alignment page alignment score:

Page Alignment Score=1000×((Sum of element alignment scores)/Sum of total areas of data elements)EQUATION 2:

If every element alignment score is zero, the resulting page alignment score will also be zero. Printing errors or print shifts may result in page alignment scores greater than zero. In the examples illustrated by FIGS. 6A, 6B, and 6C, if the three data elements represented by 620, 630, and 640 were all part of the same from, the page alignment score would be (1000*((0)+(0.15)+(0.80)))/(1000+1000+1000)=0.317

If the page alignment score for a zero shift vector is zero, the print shift may be minimal or non-existent. If the page alignment score is greater than zero, the processor 202 may adjust the positions of the form zones and calculate a new page alignment score after calculating the new element alignment scores. If zero is not achievable, then the process may iterate until it gets the smallest score possible. In this case the outcome may still have some fields that span outside of their target zones. The processor 202 may use a shift vector to adjust the form zones.

A shift vector may be comprised of a direction and distance that a form zone is to be modified. If using a grid structure, the shift vector may be comprised of an X and Y value (Horizontal component; Vertical component). A plurality of shift vectors may be stored in the data store 140. The shift vectors may have been previously used for standardized forms or situations. For example, the plurality of shift vectors may be a collection of shift vectors that have worked well with specific form types or form inputs. The processor 202 may select a shift vector based on a probability algorithm or a statistical likelihood that the shift vector is the most likely to compensate for the print shift. The processor 202 may request one or more of the shift vectors from the data store 140 through the network.

At act 312, the processor 202 modifies the position of the form zone by the shift vector that has been selected. The processor 202 modifies the position of the form zone by the direction and distance stored in the shift vector. If using a grid structure, the processor 202 may increment or decrement an X coordinate and a Y coordinate by an amount stored in the shift vector. An identified data element along with a form zone is stored in memory 204. The form zone may include one or more pixels. The one or more pixels may have an X coordinate and a Y coordinate. For example: 455|600 representing X,Y. The form zone may be modified by altering these coordinates. For example, if the form zone was to be modified 3 pixels over and 4 pixels up, the new coordinates would be (X+3)|(Y+4). Modifying the form zone may also be done with a vector indicating direction and distance. For example, the form zone may be modified 90 degrees by 5 pixels; or modified 45 degrees by 8 pixels. The form zone may be modified by 0 pixels. The zero shift vector represents the original form zones of the candidate image without alteration. In a grid structure, both the form zone and data element may be represented by one or more sets or groupings of pixel coordinates. A form zone (or data element), for example, may be represented by the following pixels: (44|44; 44|45; 44|46; 45|44; 45|45; 45|46; 46|44; 46|45; 46|46) which describes a 3×3 square. To adjust the form zone, each pixel would be incremented by an X amount and Y amount specified in the shift vector. If the shift vector is (3; 1) then the modified form zone would be represented by the following pixels: (47|45; 47|46; 47|47; 48|45; 48|46; 48|47; 49|45; 49|46; 49|47). The form zone is still a 3×3 square, but has been modified by three pixels and up by one pixel.

In order to find an optimum alignment, the form zones may be modified multiple times using different alternative shift vectors to achieve the smallest possible page alignment score. For example, the form zones may be modified each time by one or two pixels over and over again to create a list of page alignment scores involving multiple shift vectors. An example table where the form zones have been modified multiple times is listed below in Table 1. With zero shift (starting point), the example candidate image had a page alignment score of 0.035.

TABLE 1

|  |  | Y pixel offset | | | | | |
| --- | --- | --- | --- | --- | --- | --- | --- |
|  |  | 0 | 2 | 4 | 6 | 8 | 10 |
| X pixel offset | 0 | 0.035 | 0.033 | 0.032 | 0.032 | 0.032 | 0.032 |
|  | 2 | 0.032 | 0.030 | 0.029 | 0.029 | 0.029 | 0.029 |
|  | 4 | 0.029 | 0.027 | 0.026 | 0.026 | 0.026 | 0.026 |
|  | 6 | 0.026 | 0.024 | 0.023 | 0.023 | 0.023 | 0.023 |
|  | 8 | 0.023 | 0.021 | 0.020 | 0.020 | 0.020 | 0.020 |
|  | 10 | 0.021 | 0.018 | 0.017 | 0.017 | 0.017 | 0.017 |
|  | 12 | 0.018 | 0.016 | 0.014 | 0.014 | 0.014 | 0.014 |
|  | 14 | 0.016 | 0.013 | 0.012 | 0.012 | 0.012 | 0.012 |
|  | 16 | 0.013 | 0.010 | 0.009 | 0.009 | 0.009 | 0.009 |
|  | 18 | 0.010 | 0.007 | 0.006 | 0.006 | 0.006 | 0.006 |
|  | 20 | 0.008 | 0.005 | 0.003 | 0.003 | 0.003 | 0.003 |
|  | 22 | 0.005 | 0.002 | 0.000 | 0.000 | 0.000 | 0.000 |

The example candidate image achieves a zero page alignment score with a shift vector of 22×4 pixels. This is the minimum amount that the zones need to be modified to get all data elements in this example inside their target form zones.

A brute force attempt for modifying the form zones may work as above in Table 1. In another embodiment, the form zones may be modified by different amounts to find the minimum page alignment score. For example, the processor 202 may select an alternative shift vector with a certain shift amount of pixels between each try (start at 0|0; shift 0|7; shift 0|14; etc.). Another scheme may base a number of pixels shifted to have a relationship with image resolution (dots-per-inch) of the document, and/or the average size of the data characters that make up the words/data element(s). The processor 202 may use a statistical model to limit the search if there is a normal distribution of page scores. The processor 202 may select shift vectors that have a historical relationship to a type of standardized form or are related to previously inputted forms from a similar source. The processor 202 may initially select shift vectors at random to narrow down the search.

The processor 202 may also alter how a data element is associated with a form zone. If a data element is associated with the wrong from zone, a page alignment score may not be indicative of the print shift as one or more data elements may have an element alignment score that are outside a normal expected value. In order to correct this, the processor 202 may change which data elements are associated with each from zone. In one embodiment, the processor 202 adjusts data elements with the element alignment scores that are most out of line when calculating a page alignment score. An element alignment score may be out of line if the score is outside of an expected range. An example may be illustrated as such: there are five element alignment scores for a page and the five scores are 0.010, 0.015, 0.012, 0.080, and 0.008. The fourth score 0.080 may be recognized as outside a normal expected value as it is six to eight times the size of the other four scores. The processor 202 may try to select a different form zone scheme for the page including altering the data element that the fourth score corresponds to.

If zero is not achievable, then the process may iterate until it gets the smallest score possible or the reaches a defined threshold. In this case the candidate image may still have some fields that span outside of their target zones. The number of iterations may be stopped at certain number and the best (smallest) score may be selected as the final score. The shift vector that is associated this score will be used to adjust a form zone from which data may be extracted, scanned, or read for further processing.

Once the final score has been determined and the shift vector has been identified which best fixes a print shift, automated technologies may then process the candidate image. The candidate image may be processed as a whole or one or more form zones may be processed. Automated technologies such as OCR may now extract the data that is located in the modified form zone (which corresponds to the page alignment score that works best). The extracted data is then associated with the field that corresponds with the modified form zone. This extracted data may then be stored alongside the field in a database 140 for later use. The modified form zones may also be used to cut out pieces of the candidate image to transmit separately for analysis.

Figure 7:
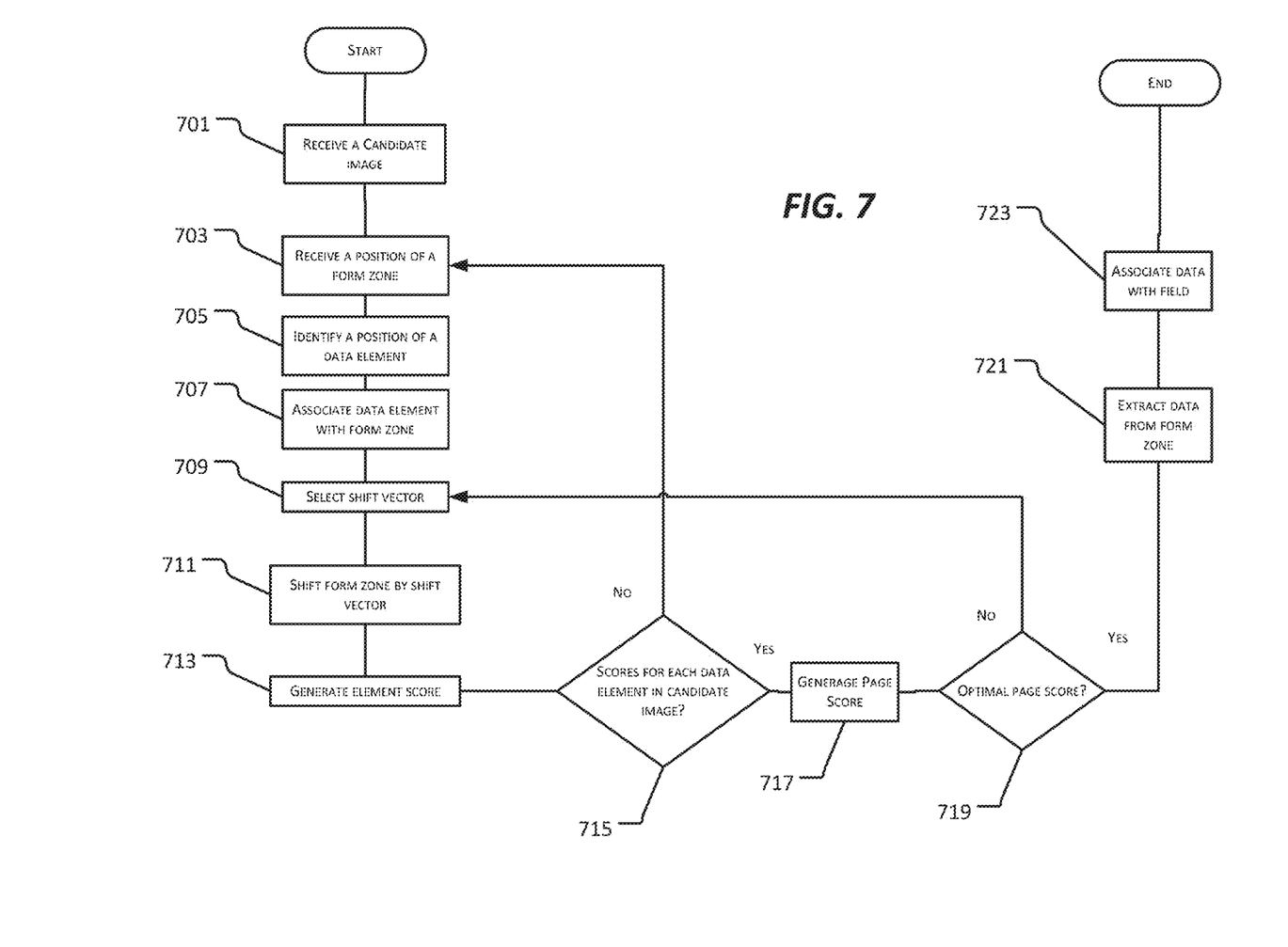
FIG. 7 is a flowchart illustrating the acts or processes implemented to compensate for print shift.

FIG. 7 illustrates a flow chart of an example embodiment for compensating for print shift in standardized forms. As presented in the following sections, the acts may be performed using any combination of the components indicated in FIG. 1 or FIG. 2. The following acts may be performed by a system 100, a computer system 200, a computing device 120, a processor 202, instructions 224 or a combination thereof. Additional, different, or fewer acts may be provided. The acts are performed in the order shown or other orders. The acts may also be repeated At act 701, the processor 202 receives a candidate image from the image acquisition device 150. The candidate image may represent a standardized form and may be in a digital format (pixelated). The candidate image may include one or more data elements. The candidate image may also contain typographical information including one or more fields.

At act 703, the processor 202 receives a definition of a form zone. The processor 202 may identify the form zone by identifying the standardized form. The processor 202 may access a data store 140 which maintains a database of extraction templates for standardized forms. The processor 202 may store a list of coordinates/address of the form zone in the data store 140. The form zone may be associated with a field.

At act 705, the processor 202 identifies the position of a data element. The processor 202 may identify the data element though use of drop out ink or by removing the pixels that correspond to the typographic information that have been previously identified and/or stored in the data store 140. The processor 202 may store a list of coordinates/addresses of the data element in the data store 140.

At act 707, the processor 202 associates the data element with the form zone. The data element closest to the form zone may be associated with that form zone. The processor 202 may use attributes from the field, form zone, or data element to determine the association.

At act 709, the processor 202 selects a shift vector. The processor 202 may select a shift vector from a plurality of shift vectors stored in the data store 140. The shift vector may be made up of a horizontal and vertical component indicating a number of pixels to be shift in any direction.

At act 711, the processor 202 modifies the position of the form zone by the amount specified by the shift vector. The processor 202 may modify the coordinates/address of the form zone that are stored in the data store 140.

At act 713, the processor 202 calculates a similarity of the data element and the modified position of the form zone. The similarity may be referred to as an element alignment score. The element alignment score may be a function of the amount of the position of the data element that is contained within the modified position of the form zone.

At act 715, the processor 202 determines if it has calculated an element alignment score for each data element on the candidate image. If not, the processor 202 associates a data element for which it has not calculated an element alignment score for with a form zone (act 707) and calculates an element alignment score for that data element using the same shift vector previously selected (act 713).

If the processor 202 has calculated the element alignment score(s) for every data element on the candidate image, at act 717, the processor 202 calculates an overall similarity score also referred to as a page alignment score. The page alignment score may be a function of the sum of the element alignment scores divided by the size of the form zones.

At act 719, the processor 202 determines if the page alignment score represents meets a threshold. If the page alignment score is zero, the alignment is generally acceptable and the process may continue to act 721. If the page alignment score is greater than zero, then there is still a data element that is not fully contained within an associated form zone. The processor 202 may select a different shift vector (act 707). There may not be a shift vector that produces a page alignment score of zero. The processor 202 may stop after using a number of different shift vectors. This number may be 20, 50, 100, or more. When the process has reached this point, the processor 202 may select the best (lowest) page alignment score that was found, identifies the shift vector used along with the associated data elements and form zones, and moves on to act 721

At act 721, the processor 202 extracts data from each form zone. Extraction may be done through OCR, intelligent character recognition (ICR), or other recognition process. Extraction may also be manually by using a process such as crowd-sourcing by multiple users to perform the recognition.

At act 723, the processor 202 associates the extracted data with the field each respective form zone is associated with. The extracted data may be stored in a database 140 along with the field.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processor 202s, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be substantially minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

We claim:

1. A computer implemented method comprising:
    receiving, by a processor, a candidate image, wherein the candidate image contains a first field and a first data element positioned in a first position with respect thereto within the candidate image, and a second field and a second data element positioned in a second position with respect thereto within the candidate image, and storing the candidate image in a memory coupled with the processor;
    receiving, by the processor, a definition of first and second form zones, and storing the definition of the first and second form zones in a memory coupled with the processor, wherein the first form zone defines a third position at which the first data element is expected to be positioned with respect to the first field and the second form zone defines a fourth position at which the second data element is expected to be positioned with respect to the second field;
    evaluating, by the processor, the first data element with respect to the third position to determine a first measure of a similarity of the first position to the third position and the second data element with respect to the fourth position to determine a second measure of a similarity of the second position to the fourth position;
    computing, by the processor, a similarity value indicative of an overall similarity of the first and second positions to the third and fourth positions based on the first and second measures; and
    iteratively comparing, by the processor, the similarity value to a similarity value of a previous iteration, modifying, by the processor, the third and fourth positions and repeating the evaluating and computing based on the modified third and fourth positions until the computed similarity value meets a threshold.

2. The computer implemented method of claim 1, further comprising:
    extracting, by the processor, first data from the modified third position and second data from the modified fourth position; and
    associating, by the processor, the extracted first data with the first field and the extracted second data with the second field.

3. The computer implemented method of claim 1, wherein modifying comprises:
    incrementing, by the processor, the third and fourth positions by a shift vector stored in the memory.

4. The computer implemented method of claim 3, wherein a shift vector is generated by a processor by incrementing a previously selected shift vector by a number of pixels.

5. The computer implemented method of claim 3, further comprising:
    identifying, by the processor, a form type of the candidate image; and
    selecting, by the processor, a shift vector that corresponds to the form type.

6. The computer implemented method of claim 1, wherein evaluating the first data element with respect to the third position to determine a first measure of a similarity comprises:
    calculating, by the processor, an overlap between the first position of the data element and the third position.

7. The computer implemented method of claim 1, wherein receiving a candidate image further comprises:

identifying, by the processor, the first position of the first data element and the second position of the second data element.

8. The computer implemented method of claim 7, wherein the candidate image contains form data; and wherein identifying the first position and the second position uses drop out ink to separate the form data from the first and second data elements.

9. The computer implemented method of claim 7, wherein the candidate image contains form data; and wherein identifying the first position and the second position uses form template identification to separate the form data from the first and second data elements.

10. The computer implemented method of claim 1, wherein computing the similarity value based on the first and second measures comprises averaging the first and second measures.

11. The computer implemented method of claim 1, wherein computing the similarity value based on the first and second measures comprises summing the first and second measures.

12. The computer implemented method of claim 1, wherein the computed similarity value meets the threshold when the third position coincides with the first position and the fourth position coincides with the second position.

13. A system comprising:
a controller in communication with a storage device configured to receive and accessibly store a generated one or more candidate images and candidate image data, wherein the controller is operable to:
receive a candidate image, wherein the candidate image contains a first field, a second field, a first data element, and a second data element;
identify a first position for the first data element with respect thereto within the candidate image, and a second position for the second data element with respect thereto within the candidate image;
receive a definition of first and second form zones, wherein the first form zone defines a third location at which the first data element is expected to be positioned with respect to the first field and the second form zone defines a fourth location at which the second data element is expected to be positioned with respect to the second field;
evaluate the first data element with respect to the third position to determine a first measure of a similarity of the first position to the third position and the second data element with respect to the fourth position to determine a second measure of a similarity of the second position to the fourth position;
compute a similarity value indicative of an overall similarity of the first and second positions to the third and fourth positions based on the first and second measures; and
iteratively compare the overall similarity to a previous iteration, modify the third and fourth positions and repeat the evaluating and computing based on the modified third and fourth positions until the computed similarity value meets a threshold.

14. The system of claim 13, wherein the controller is further operable to:
extract data from the third position of the modified first form zone; and
associate the extracted data with the first field.

15. The system of claim 13, wherein a measure of a similarity is a percentage of the first position of the first data element that overlap with the third position of the first form zone.

16. The system of claim 13, wherein the controller is further operable to:
modify the third and fourth positions by a shift vector, wherein the shift vector comprise a horizontal number of pixels and a vertical number of pixels.

17. The system of claim 13, wherein the candidate image includes form data; and
wherein the controller is further operable to:
identify the first position and the second position by using drop out ink to separate the form data from the first and second data elements.

18. The system of claim 13, wherein the computed similarity value meets the threshold when the third position coincides with the first position and the fourth position coincides with the second position.

19. The system of claim 13, wherein the controller is further operable to compute the similarity value by averaging the first and second measures.

20. A system comprising:
means for receiving a candidate image, wherein the candidate image contains a first field and a first data element positioned in a first position with respect thereto within the candidate image, and a second field and a second data element positioned in a second position with respect thereto within the candidate image;
means for receiving a definition of first and second form zones, wherein the first form zone defines a third position at which the first data element is expected to be positioned with respect to the first field and the second form zone defines a fourth position at which the second data element is expected to be positioned with respect to the second field;
means for evaluating the first data element with respect to the third position to determine a first measure of a similarity of the first position to the third position and the second data element with respect to the fourth position to determine a second measure of a similarity of the second position to the fourth position;
means for computing a similarity value indicative of an overall similarity of the first and second positions to the third and fourth positions based on the first and second measures; and
means for iteratively comparing the similarity value to a similarity value of a previous iteration, modifying the third and fourth positions and repeating the evaluating and computing based on the modified third and fourth positions until the computed similarity value meets a threshold.

* * * * *